United States Patent [19]

Swanson

[11] 4,425,241

[45] Jan. 10, 1984

[54] DRILLING FLUIDS

[75] Inventor: Billy L. Swanson, Bartlesville, Okla.

[73] Assignee: Phillips Petroleum Company, Bartlesville, Okla.

[21] Appl. No.: 331,031

[22] Filed: Dec. 16, 1981

Related U.S. Application Data

[63] Continuation-in-part of Ser. No. 235,485, Feb. 18, 1981, abandoned.

[51] Int. Cl.$^3$ .............................................. C09K 7/02
[52] U.S. Cl. ............................. 252/8.5 C; 252/8.5 A
[58] Field of Search ............ 252/8.5 A, 8.5 C, 8.55 R

[56] References Cited

U.S. PATENT DOCUMENTS

| | | | |
|---|---|---|---|
| 2,425,768 | 8/1947 | Wagner | 252/8.5 |
| 2,618,595 | 11/1952 | Gloor | 252/8.5 |
| 2,775,557 | 12/1956 | Morgan | 252/8.5 |
| 2,854,407 | 9/1958 | Mallory | 252/8.5 |
| 3,198,268 | 8/1965 | Lindblom et al. | 252/8.5 |
| 3,516,496 | 6/1970 | Barkman et al. | 166/281 |
| 3,525,688 | 8/1970 | Swanson | 252/8.5 |
| 3,613,790 | 10/1971 | Stout et al. | 166/294 |
| 3,747,681 | 7/1973 | Davis, Jr. et al. | 166/307 |
| 3,779,914 | 12/1973 | Nimerick | 252/8.55 R |
| 3,818,998 | 6/1974 | Hessert | 175/72 |
| 3,836,465 | 9/1974 | Rhudy et al. | 252/8.5 C |
| 3,989,630 | 11/1976 | Walker | 252/8.5 |
| 3,993,551 | 11/1976 | Assarsson et al. | 204/159.14 |
| 4,005,749 | 2/1977 | Birk | 166/273 |
| 4,141,746 | 2/1979 | Schweiger | 536/59 X |
| 4,172,800 | 10/1979 | Walker | 252/8.5 |
| 4,239,629 | 12/1980 | Sauber | 252/8.5 C |

FOREIGN PATENT DOCUMENTS

| | | |
|---|---|---|
| 1645283 | 6/1965 | Fed. Rep. of Germany. |
| 2036055 | 6/1980 | United Kingdom. |
| 1591313 | 6/1981 | United Kingdom. |

*Primary Examiner*—Herbert B. Guynn

[57] ABSTRACT

Polyethylene glycols in combination with at least one water-dispersible polymeric viscosifier comprising cellulose ethers, cellulose sulfate esters, polyacrylamides, guar gum, or heteropolysaccharides improve the water loss properties of water-based drilling fluids, particularly in hard brine environments.

22 Claims, No Drawings

DRILLING FLUIDS

This application is a continuation-in-part of my copending application having Ser. No. 235,485, filed Feb. 18, 1981, now abandoned.

This invention relates to water-based drilling fluids. In another aspect, this invention relates to controlling the rheological properties of water-based drilling muds. In another aspect, this invention relates to a method of drilling a well utilizing water-based drilling fluids exhibiting improved water loss control. In accordance with a further aspect, this invention relates to an additive package comprising polyethylene glycol and selected polymeric viscosifiers to significantly reduce water loss in drilling fluids.

In the drilling of wells by the rotary method, a drilling fluid is used which generally consists of an aqueous clay suspension often containing weighting agents to increase the hydrostatic head and frequently also containing concentrated colloidal suspending and conditioning agents.

The drilling fluid serves to bring cuttings to the surface, to cool the bit and to keep the oil, gas and water confined to their respective formations during the drilling process. For these functions, it is necessary that the drilling fluid be of pumpable viscosity, have sufficient carrying capacity to bring cuttings to the surface, and yet be fluid enough to release cuttings and entrained gas at the surface.

A highly important property of drilling muds is the ability to form an impervious filter cake upon the permeable walls of the bore hole, thus inhibiting further ingress of water from the drilling fluid into the formation. Excessive fluid loss from drilling fluids can cause severe problems. For example, filter cake build-up can become so thick that the drill pipe may become stuck. Also, there may be great difficulty in withdrawing pipe from the hole. Also, high water losses can cause sloughing and caving in of shale formations. In addition, electrical logging of the well can be adversely influenced due to the mud filtrates, etc.

Various water loss control agents have been previously proposed to improve the properties of drilling fluids, but not all of these have been successful. Applicant has discovered a particular additive combination which has attractive properties as a fluid loss control agent.

Accordingly, an object of this invention is to provide an improved drilling fluid.

Another object of this invention is to provide an improved method of drilling a well.

Another object of the invention is to control the rheological properties of drilling fluids.

Other objects, aspects, as well as the several advantages of the invention will be apparent to those skilled in the art upon reading the following disclosure and appended claims.

According to the invention, the water loss property of drilling muds is improved by the addition of a polyethylene glycol and at least one water-dispersible polymeric viscosifier selected from cellulose ethers, cellulose sulfate esters, polyacrylamides, guar gum, and heteropolysaccharides in amounts sufficient to reduce water loss.

It has been found that the combination of polyethylene glycols with water-dispersible polymeric viscosifiers, as defined, significantly improves the water loss property of drilling muds, particularly in hard brine environments.

Polyethylene glycols that can be used, according to the invention, in combination with the polymeric viscosifiers can be characterized by the formula $HO(CH_2CH_2O)_nH$ wherein n can vary from about 20 to about 225,000. The polyethylene glycols of the invention can be the products of an ethylene oxide polymerization reaction or the products of ethylene glycol polymerization. The polyethylene glycols employed, according to the invention, generally will have a molecular weight ranging from about 1,000 to about 10,000,000, preferably about 4,000 to about 100,000 and a most preferred molecular weight range of about 6,000 to about 20,000. Presently, Dow E8000 polyethylene glycol with a molecular weight of about 8,000 is most preferred.

In general, any of the water dispersible cellulose ethers, cellulose sulfate esters, polyacrylamides, guar gum, and heteropolysaccharides, including mixtures thereof, can be used with the above-defined polyethylene glycols in practicing this invention. The term "water-dispersible" is intended to apply to truly water soluble polymers as well as those which can be dispersed in colloidal form into water.

The cellulose ethers which can be used include, among others: the various carboxyalkyl cellulose ethers such as carboxyethyl cellulose and carboxymethyl cellulose (CMC); mixed ethers such as carboxyalkyl hydroxyalkyl ethers such as carboxymethyl hydroxyethyl cellulose (CMHEC); hydroxyalkyl celluloses such as hydroxyethyl cellulose and hydroxypropyl cellulose; alkyl hydroxyalkyl celluloses such as methyl hydroxypropyl cellulose; alkyl celluloses such as methyl cellulose, ethyl cellulose and propyl cellulose; alkyl carboxyalkyl celluloses such as ethyl carboxymethyl cellulose; alkyl alkyl celluloses such as methylethyl cellulose; and the like. Many of the cellulose ethers are available commercially in various grades. The carboxy substituted cellulose ethers are available as the alkaline metal salt, usually the sodium salt. However, the metal is seldom referred to and these polymers are commonly referred to as CMC for carboxymethyl cellulose and CMHEC for carboxymethyl hydroxyethyl cellulose, etc. A presently preferred cellulose ether is CMHEC.

CMHEC polymers suitable for use in the present invention are characterized by a degree of substitution (D.S.) in the broad range of about 0.1 to about 1, preferably about 0.2 to about 0.5 and a molar substitution (M.S.) in the broad range of about 1 to about 4, preferably about 2 to about 3. The "degree of substitution" designates the average number of hydroxyl groups per cellulosic anhydroglucose unit which are substituted with carboxymethyl groups. The "molar substitution" designates the average number of moles of hydroxyethyl groups present per cellulosic anhydroglucose unit. Presently, the most preferred CMHEC is CMHEC 420H possessing 0.4 carboxymethyl D.S. and 2.0 hydroxyethyl M.S.

The polyacrylamides which can be employed in this invention include the homopolymers and copolymers of acrylamide and methacrylamide. It is generally preferred to employ the substantially linear homopolymers and copolymers of acrylamide and methacrylamide. By substantially linear it is meant that the polymers are substantially free of crosslinking between the polymer chains. Said polymers can have up to about 75 percent of the carboxamide groups hydrolyzed to carboxyl groups. However, it is expected that this kind of polymer would be more effective in hard brines if the hydrolysis is kept to a minimum. As used herein, and in the claims, and as otherwise specified, the term "hydrolyzed" includes modified polymers wherein the carboxyl groups are in the salt form, provided such salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

Substantially linear polyacrylamides are known in the art and can be obtained commercially. They are generally obtained by carrying out the polymerization in an aqueous medium, in the presence of a small but effective amount of a water-soluble oxygen-containing catalyst, e.g., a thiosulphate or bisulphate of potassium or sodium or in an organic hydroperoxide, at a temperature between about 30° and 80° C. The resulting polymer is recovered from the aqueous medium, as by drum drying, and can be subsequently ground to the desired particle size.

Included among the copolymers which can be used in the practice of the invention are the water-dispersible copolymers resulting from the polymerization of a major portion of the acrylamide or methacrylamide and a minor portion of an ethylenically unsaturated monomer copolymerizable therewith. It is desirable that sufficient acrylamide or methacrylamide be present in the monomers mixture to impart to the copolymer the above-described water-dispersible properties, for example, from about 20 to 99 percent acrylamide and from about 1 to 80 percent other ethylenically unsaturated monomers. Such other monomers include acrylic acid, methacrylic acid, vinyl sulfonic acid, vinyl benzyl sulfonic acid, acrylonitrile, methacrylonitrile, vinyl alkyl ether, vinyl chloride, maleic anhydride, and the like.

Various methods are known in the art for preparing said homopolymers and copolymers. For example, see U.S. Pat. Nos. 2,625,529; 2,740,522; 2,729,557; 2,831,841; 2,909,508; 3,818,998; and 4,103,742; all of these patents are incorporated herein by reference. Said copolymers can also be used in hydrolyzed form, as discussed above for the homopolymers.

Suitable heteropolysaccharides include those produced by fermentation of carbohydrates by bacteria of the genus Xanthomonas. Exemplary of such heteropolysaccharides are those produced by Xanthomonas campestris, Xanthomonas begonia, Xanthomonas phaseoli, Xanthomonas hederae, Xanthomonas incanae, Xanthomonas carotae, and Xanthomonas translucens. A commercially available polysaccharide identified by the trade name of BIOZAN supplied by Biospecialties is presently preferred.

The cellulose sulfate esters that can be used include the sulfate esters of polyhydroxy polymers described in U.S. Pat. No. 3,702,843 and the cellulose sulfate esters described in U.S. Pat. No. 4,141,746, both of which are incorporated herein by reference. A presently preferred polymeric viscosifier in this class is cellulose sulfate XH3 sold by Stauffer Chemical Company.

Another suitable polymeric viscosifier that can be used according to the invention is guar gum. Guar gum is a free-flowing nonionic, water soluble polymer. Guaran, the scientific name for guar gum, is a straight-chain mannan with single-membered galactose branches composed of about 80% D-galacto-D-mannoglycan, 5% proteins, 2% crude fibers, and 1% ash. The ratio of D-galactose to D-mannose in guaran is 35:65. The D-mannopyranose units are joined by (1 4) links, and single D-galactopyranose units are joined to this chain by a (6) links. On the average, the galactose branches occur in every other mannose unit. A commercially available guar gum identified as Guar THI sold by Hercules Incorporated is presently preferred.

It should be understood by those skilled in the art, based upon specific working examples and the specification, that it is within the scope of the invention to use mixtures of the polymeric viscosifiers defined herein as well as mixtures of polyethylene glycols. For example, one can use mixtures of the cellulose ethers such as HEC polymers with CMHEC polymers, CMHEC polymers with polyacrylamides, and other polymeric mixtures, in admixture with polyethylene glycol (PEG) such as Dow E8000. Conversely, mixtures of polyethylene glycols, e.g., E8000 and E9000, can be used in combination with individual or mixtures of polymeric viscosifiers, e.g., mixtures of cellulose ethers, mixtures of polyacrylamides with guar gum, mixtures of cellulose ethers with guar gum, or other water-dispersible polymeric viscosifiers, and the like.

The weight ratio of total polymeric viscosifier to polyethylene glycol varies appreciably depending upon the polymeric viscosifier(s) being used but generally will range from about 3:1 to about 1:3 with a weight ratio of 1:1 being preferred. As disclosed herein, the invention contemplates the use of a single polymeric viscosifier as well as mixtures of two or more polymeric viscosifiers which can be added singly or together in the drilling composition.

In the final mud composition, the combined amount of polymeric viscosifier and polyethylene glycol present in the mud can vary appreciably but will be an amount which is sufficient to reduce water loss due to filtration through a filter cake in a well—in other words, a water loss reducing amount. Generally, the mixture of polyethylene glycol and total polymeric viscosifier(s) comprises in the range of about 0.25 to 3 lb/bbl based on barrels of mud composition, preferably in the range of about 0.75 to about 2.0 lbs/additive per barrel of mud.

In actual operation, the polyethylene glycol and one or more polymeric viscosifiers can be blended together as as an additive package for incorporation into a drilling mud. In the event more than one polymeric viscosifier is used, the polymeric viscosifiers can be added together or separately to a mud which can contain a polyethylene glycol. It is also within the scope of the invention to add a polymeric viscosifier, e.g., polyacrylamide, to a mud followed by addition of a mixture of another polymeric viscosifier and polyethylene glycol, e.g., guar gum and polyethylene glycol.

The additive package of the instant invention is suitable for use in fresh water, brackish water, and hard brine environments.

As used herein, the term "brine" is intended to include any aqueous solution of mineral salts having greater than 10,000 ppm dissolved solids content, such as are frequently present in oil fields. Oil field brines commonly contain varying amounts of sodium chloride, calcium chloride, or magnesium salts.

Brines containing other mineral salts, such as potassium chloride, may be prepared for use in drilling fluids.

The drilling compositions of the invention preferably comprise an aqueous composition containing a clayey material, at least one polymeric viscosifier, a polyethylene glycol component, weighting, suspending and conditioning agents. Additives such as oxidation and corrosion inhibitors, bactericides, etc., can be added to the aqueous solution.

Suitable weighting agents that can be used include $BaSO_4$, $CaCO_3$, $BaCO_3$, iron carbonate, and the like.

Asbestos is used as a suspending agent for the weighting material in the inventive compositions. In this role asbestos is relatively inexpensive and the desirable flow characteristics (rheological properties) of the fluid systems are maintained. Of the various types of asbestos which are commercially available, the asbestos derived from chrysotile is presently preferred. The chrysotile asbestos fibers provide maximum carrying or suspending properties with a minimum of asbestos.

The available field water in the Williston Basin, for example, is a hard brine which causes polymeric components such as cellulose ethers to precipitate in drilling muds and as a result water loss control is poor. Correlated with poor water loss control is undesirable filter cake build-up. In many instances, the ultimate problem with poor water loss control is the build-up of a thick filter cake, e.g., above the drill bit making it impossible to remove the tool from the hole. The hole then must be re-worked in order to remove the tool and continue the drilling operation. It is to be noted that CMHEC alone in hard brine muds effects poor water loss control although the polymer itself is tolerant of high levels of calcium. The difficulty perhaps is caused by the low tolerance of CMHEC polymers for clay solids.

In utilizing the drilling fluid of the invention, a well is drilled by rotating a hollow drill stem having a drill bit attached thereto to form a bore hole and the drilling fluid is circulated down through the drill stem and out the bit and then upwardly to deposit a filter cake on the walls of the bore hole and carry cuttings to the surface.

The following examples will serve to further illustrate the invention.

EXPERIMENTAL PROCEDURES

(A) Laboratory Procedure

Drilling mud samples were prepared in quart jars with 280 mL aliquots of fresh water or synthetic hard brine. Quart jars were used because of the foam that was generated while stirring with a Multimixer. The samples were transferred to pint jars for testing and aging after any foam had subsided. A silicone based defoamer was added in severe cases of foaming.

In formulations containing clay, the clay was usually added first to the fresh water or brine medium and this mixture was stirred in a Multimixer for about 10 minutes before the subsequent addition of polyethylene glycol and cellulose ether either individually or as a blend. The total mixture was then stirred for an additional 20 minutes in the Multimixer before testing.

A large portion of the testing with CMHEC 420H was done with a synthetic hard brine containing 15,000 ppm calcium ion. In the presence of up to 60,000 ppm $Ca^{++}$ no dramatic effect on mud properties was noted. A typical synthetic hard brine was prepared by mixing 3150 mL saturated sodium chloride solution, 350 mL fresh water and 150 g calcium chloride. Magnesium was added to the mud systems at the level of 6 lbs/bbl $MgCl_2 \cdot 6H_2O$ (2000 ppm $Mg^{++}$) as desired to observe the effects of $Mg^{++}$. One representative synthetic hard brine was prepared by mixing 2200 mL saturated NaCl solution, 1800 mL tap water, 172 g $CaCl_2$ and 67 g $MgCl_2 \cdot 6H_2O$. The density of this brine was 9.5 lbs/gal with a hardness of 15,000 ppm $Ca^{++}$ and 2000 pm $Mg^{++}$.

Water loss was determined according to the method of Section 3 disclosed in "API Recommended Practice, Standard Procedures for Testing Drilling Fluids," API RP 13B, First Edition, November 1962.

(B) Field Procedure

A 1:1 wt/wt mixture of Dow E8000 polyethylene glycol and CMHEC 420H is added to the available field brine optionally with a suspending agent such as FLOSAL® asbestos and thoroughly mixed before being used as a drilling mud. Additional make-up quantities of the mixture and FLOSAL are added to the mud as needed during the drilling of the bore hole. FLOSAL sweeps are used as necessary to remove cuttings to keep the hole cleared. Clay is not normally added to the drilling mud formulation because of the low tolerance, e.g., of CMHEC polymers for commercially available clay solids. Suitable polyethylene glycols improve the tolerance of CMHEC polymers for clay solids and seem to improve the carrying capacity of FLOSAL in polymer-muds.

WORKING EXAMPLES

The following examples demonstrate the enhanced water loss control in systems containing polyethylene glycols such as Dow E8000 (molecular weight ca. 8000) and polymeric viscosifiers such as cellulose ethers (CMHEC, CMC, and HEC), natural gums such as guar gum, heteropolysaccharides such as BIOZAN, and the like including Stauffer cellulose sulfate XH3. The mixing of samples and water loss tests were carried out as described in the laboratory procedure in the Experimental Section hereinabove.

EXAMPLE I

The inventive package referred to herein as a 1:1 wt/wt blend of Dow E8000 polyethylene glycol and CMHEC 420H was mixed into a base mud comprising 3.5 weight percent attapulgite in saturated salt water to give a composition equivalent to 1 lb/bbl E8000 and 1 lb/bbl CMHEC 420H (see run 1 in Table 1 below). Other loadings were prepared at the lb/bbl levels shown in Table 1.

TABLE 1

| Water Loss Control for CMHEC and Polyethylene Glycol in Saturated Salt Water Mud | | | | |
|---|---|---|---|---|
| Run | Components lb/bbl | | | Water |
| No. | E8000# | CMHEC# | pH | Loss |
| 1 | 1.0 | 1.0 | 8.0 | 17.0 |
| 2 | 0.0 | 2.0 | 7.9 | 15.5 |
| 3 | 0.0 | 1.5 | 7.8 | 17.0 |
| 4 | 0.5 | 1.5 | 8.0 | 12.5 |
| 5 | 1.0 | 0.0 | 8.1 | 136.0 |
| 6 | Base Mud* | 0.0 | 7.6 | 115.0 |

E8000 represents Dow E8000 (ca. MW @ 8000) polyethylene glycol; CMHEC was CMHEC 420H described hereinabove.
*Base mud was 3.5 weight percent attapulgite clay in saturated salt water.

Runs 1 and 4 demonstrate the general operability of the instant invention. Runs 5 and 6 show that individually the base mud, and polyethylene glycol plus the base mud exhibit very high and undesirable water loss control properties. A surprising result can be seen by considering runs 2 and 4 with a total additive loading of 2 lbs/bbl. In run 4, 0.5 lb/bbl of CMHEC was backed-out with 0.5 lb/bbl E8000 and this blend imparted a water loss of 12.5 mL/30 min. to the resulting mud composition which is better than the 15.5 mL/30 min. water loss (run 2) exhibited by a mud containing 2 lb/bbl CMHEC with no added polyethylene glycol. This is an unexpected result in view of the poor water loss control in a mud (run 5), containing only the polyethylene glycol in the base mud.

Referring to runs 3 and 4, it is surprising that the addition of 0.5 lb/bbl of polyethylene glycol to 1.5 lb/bbl CMHEC gave a mud with better water loss control (12.5 mL/30 min.; run 4) than did the addition of 1.5 lb/bbl CMHEC alone to a mud as shown in run 3 (17.0 mL/30 min.).

EXAMPLE II

This example demonstrates the effectiveness of polyethylene glycol and carboxymethyl cellulose in reducing water loss in saturated salt water muds. The results are summarized in Table 2.

TABLE 2

Water Loss Control for CMC and Polyethylene Glycol in Saturated Salt Water Mud[a]

| Run No. | Components, lb/bbl | | pH | Water Loss |
|---|---|---|---|---|
| | E8000[a] | CMC[a] | | |
| 8 | 0.0 | 1.5 | 8.0 | 14.5 |
| 9 | 0.75 | 0.75 | 7.8 | 30.3 |
| 10 | 0.0 | 2.0 | 8.0 | 10.4 |
| 11 | 1.0 | 1.0 | 8.0 | 18.5 |
| 12 | 0.5 | 1.5 | 8.0 | 11.4 |
| 13 | 0.0 | 1.0 | 7.7 | 27.0 |
| 14 | 1.0 | 0.0 | 8.1 | 136.0 |
| 15 | Base Mud* | 0.0 | 7.6 | 115.0 |

[a]E8000 represents Dow E8000 polyethylene glycol; CMC represents carboxymethyl cellulose
*Base mud was 3.5 weight percent attapulgite clay in saturated salt water Runs 9, 11, and 12 demonstrate the general operability of the instant invention. Runs 14 and 15 show ineffective water loss control in the base mud and the base mud plus the polyethylene glycol alone. Runs 10 and 12 demonstrate the most dramatic effect between the polyethylene glycol and CMC. The water loss (11.4 mL/30 min.) in run 12 is essentially equal to that of run 10 (10.4 mL/30 min.) although 25% of the CMC has been replaced with E8000. In general, it is indeed surprising that muds containing the E8000 polyethylene glycol exhibit relatively desirable water loss control in view of the very high water loss levels in runs 14 and 15.

A comparison of runs 8 and 12 show the improved and unexpected water loss control associated with the addition of 0.5 lb/bbl polyethylene glycol to 1.5 lb/bbl CMC. Run 13 suggests the ineffectiveness of CMC alone at the 1 lb/bbl level. Likewise, run 9 suggests a similar ineffectiveness of a 1:1 wt/wt blend of E8000 and CMC at a total additive loading of 1.5 lb/bbl. A 1:1 wt/wt blend of E8000 and CMC at a total additive loading of 2.0 lbs/bbl gives a mud exhibiting better water loss control. The presence of the polyethylene glycol in run 11 (water loss 18.5 mL/30 min.) appears to enhance the effectiveness of CMC alone (run 13; water loss 27.0 mL/30 min.).

EXAMPLE III

This example demonstrates the reduction in water loss for polyethylene glycol and cellulose sulfate (Stauffer Chemical Company cellulose sulfate XH3) in hard brine muds. The results are summarized in Table 3.

TABLE 3

Water Loss Control for Cellulose Sulfate XH3 and Polyethylene Glycol in Hard Brine Mud#

| Run No. | Component, lb/bbl | | pH | Water Loss* |
|---|---|---|---|---|
| | E8000 | Cellulose Sulfate XH3 | | |
| 16 | 1.0 | 0.0 | 7.9 | 253.0 |
| 17 | 0.0 | 1.0 | 6.8 | 16.9 |
| 18 | 0.5 | 0.5 | 6.8 | 20.1 |
| 19 | 0.3 | 0.7 | 6.8 | 16.3 |
| 20 | 0 | 0.5 | 6.8 | 94.0 |
| 21 | 0.5 | 0.5 | 6.9 | 22.8 |
| 22 | 0.5 | 0.5 | 6.8 | 19.5 |

Brine was prepared by mixing 3150 mL saturated NaCl solution, 350 mL fresh water and 150 g CaCl$_2$. In addition to the indicated amounts of E8000 and cellulose sulfate XH3, the mud composition contained 6 lb/bbl MgCl$_2$.6H$_2$O; 16 lb/bbl P95 clay and 2 lb/bbl FLOSAL ® asbestos. P95 clay is illite clay from Rogers Lake, CA.
*Water loss values are expressed as mL/30 min.

Runs 18, 19, 21, and 22 are inventive runs. Runs 16 and 20 show, respectively, the poor water loss control in muds containing E8000 1.0 lb/bbl and cellulose sulfate XH3 (0.5 lb/bbl). Neither component alone in the compositions imparted good water loss control to the respective muds. A 30% replacement of XH3 (run 17) with E8000 in run 19 significantly reduces the water loss from 16.9 to 16.3. This is surprising in view of the 253 mL/30 min. water loss in run 16 (E8000 alone) and the 94 mL/30 min. water loss in run 20 (cellulose sulfate XH3 alone).

Runs 18, 21, and 22 are duplicates at a total additive loading of 1 lb/bbl (0.5 lb/bbl polyethylene glycol and 0.5 lb/bbl cellulose sulfate XH3). It is surprising that the average water loss control in these runs (ca. 20) is significantly lower than observed for the mud in run 20 (0.5 lb/bbl cellulose sulfate XH3 alone) which gave a 94 mL/30 min. water loss and the 253 ml/30 min. water loss of run 16 for a mud containing 1 lb/bbl E8000 alone.

EXAMPLE IV

This example illustrates the use of polyethylene glycol and hydroxyethyl cellulose (HEC, NATROSOL 150 HHW) to reduce water loss in hard brine muds. The results are summarized in Table 4.

TABLE 4

Water Loss Control for Hydroxyethyl Cellulose (HEC) and Polyethylene Glycol in Hard Brine Muds#

| Run No. | Components, lb/bbl | | pH | Water Loss+ |
|---|---|---|---|---|
| | E8000 | NATROSOL | | |
| 23 | 0.0 | 1.0** | 7.2 | 16.9 |
| 24 | 0.3 | 0.7** | 7.2 | 22.9 |
| 25 | 0.4 | 0.6** | 7.3 | 19.2 |
| 26 | 0.5 | 0.5** | 7.3 | 17.5 |
| 27 | 0.6 | 0.4** | 7.3 | 17.8 |
| 28 | 1.0 | 1.0*** | 6.9 | 7.4 |
| 29 | 0.0 | 2.0*** | 6.9 | 7.4 |
| 30 | 0.5 | 0.5*** | 6.9 | 13.4 |
| 31 | 0.0 | 1.0*** | 6.8 | 11.8 |
| 32 | 1.0[a] | 0.0 | 7.9 | 253 |
| 33 | Base Mud* | 0.0 | 7.2 | 215 |

**NATROSOL 150 HHW was used as the HEC component in these runs.
***NATROSOL 250 HHW was used as the HEC component in these runs.
The hard brine was prepared by adding 1235 g NaCl, 307.7 g CaCl$_2$ and 78.5 g MgCl$_2$.6H$_2$O to 5000 mL tap water. In addition to the indicated amounts of E8000 and NATROSOL 150 HHW or NATROSOL 250 HHW, the mud compositions contained 16 lb/bbl P95 clay and 2 lb/bbl FLOSAL ® asbestos. P95 clay is illite clay from Rogers Lake, CA.
+Water loss values are expressed as mL/30 min.
*Base mud comprises the composition of footnote # without HEC and E8000.
[a]Taken from Table III: Run 32 was carried out in a slightly different hard brine.

Runs 24–28 and 30 are invention runs. Runs 32 and 33 show, respectively, the poor water loss control in the base mud plus polyethylene glycol (253 mL/30 min.) and in the base mud itself (215 ml/30 min.). Improved water loss control in systems containing polyethylene glycol (E8000) and hydroxyethyl cellulose (NATROSOL 150 HHW) is shown in the series of runs 23–27. It is unexpected that up to 60% of the NATROSOL 150 HHW could be replaced with E8000 (runs 24–27) without observing a catastrophic increase in water loss in view of the very high water loss value (253 mL/30 min.) in run 32. As a matter of fact, at the 50% replacement level (run 26), enhancement of water loss control is clearly demonstrated as the water loss value (17.5 mL/30 min.) essentially equals the water loss value in run 23 (16.9 mL/30 min. with no added E8000).

In the NATROSOL 250 HHW runs 28–31, enhanced water loss control is demonstrated by comparing, respectively, runs 28 and 29 as well as runs 30 and 31. Referring to runs 28 and 29, a 50% replacement of the HEC with E8000 gave no change in water loss. in runs 30 and 31, a 50% replacement of the HEC with E8000 resulted in only a small increase in water loss: 11.8 mL/30 min. in run 31 (no E8000) and 13.4 mL/30 min. in run 30 (50% E8000). These results are very surprising, particularly in view of the poor water loss control in a mud containing the polyethylene glycol with no added HEC (run 32).

EXAMPLE V

This example illustrates the use of polyethylene glycol (E8000) and BIOZAN heteropolysaccharide as water loss control agents in hard brine muds. The results are summarized in Table 5.

TABLE 5

Water Loss Control For Heteropolysaccharide and Polyethylene Glycol in Hard Brine Muds#

| Run No. | Components, lb/bbl | | | Water Loss* |
|---|---|---|---|---|
| | E8000 | BIOZAN | pH | |
| 34 | 1.0 | 0.0 | 7.9 | 253 |
| 35 | 0.0 | 1.0 | 7.0–7.2 | 16.2 |
| 36 | 0.2 | 0.8 | 7.0–7.2 | 16.5 |
| 37 | 0.4 | 0.6 | 7.0–7.2 | 20.1 |
| 38 | 0.0 | 0.6 | 7.0–7.2 | 26.0 |

A hard brine containing 15000 ppm Ca$^{++}$ was used in preparing these muds. The mud also contained 16 lb/bbl P95 clay in addition to the designated amounts of BIOZAN and E8000.
*Water loss values are expressed as mL/30 min.

Runs 36 and 37 are invention runs. Run 34 (taken from the hard brine runs in Table 3) is included to show the very poor water loss control in a mud containing only polyethylene glycol. Runs 36 and 37 show, respectively, that 20% and 40% replacement of BIOZAN with E8000 doesn't result in a sharp increase of water loss, e.g., water loss values of 16.5 and 20.1 compared to run 35 with no added E8000 displaying a water loss of 16.2 mL/30 min. This is unexpected in view of the ineffective water loss control for a mud containing only the polyethylene glycol additive (run 34; 253 mL/30 min.). Run 38 is a BIOZAN control run.

EXAMPLE VI

This example demonstrates the use of polyethylene glycol (E8000) and guar gum THI as water loss additives in hard brine muds. The results are summarized in Table 6.

TABLE 6

Water Loss Control for Guar Gum (THI) and Polyethylene Glycol (E8000) in Hard Brine Muds#

| Run No. | Components, lb/bbl | | pH | Water Loss* |
|---|---|---|---|---|
| | E8000 | Guar Gum | | |
| 39 | 1.0 | 0.0 | 7.9 | 253 |
| 40 | 0.0 | 1.0 | 6.9–7.3 | 14.4 |
| 41 | 0.4 | 0.6 | 6.9–7.3 | 12.4 |
| 42 | 0.2 | 0.8 | 6.9–7.3 | 12.0 |
| 43 | 0.0 | 0.6 | 6.9–7.3 | 21.4 |

A hard brine containing 15000 ppm Ca$^{++}$ was used in preparing these muds. The mud also contained 16 lb/bbl P95 clay in addition to the designated amounts of guar gum and E8000.
*Water loss values are expressed as mL/30 min.

Runs 41 and 42 are invention runs. Run 39 (taken from the hard brine runs in Table 3) is included to show the very poor water loss control in a mud containing only the polyethylene glycol adjuvant. Runs 41 and 42 show, respectively, that 40% and 20% replacement of guar gum THI (from Hercules, Inc.) with E8000 results in a better water loss control, e.g., water loss values of 12.4 and 12.0 compared to run 40 with no added E8000 displaying a water loss of 14.4 mL/30 min. This is unexpected in view of the ineffective water loss control for a mud containing only the polyethylene glycol additive (run 39, 253 mL/30 min.). Run 43 is a guar gum THI control run.

As demonstrated by the above examples, the present invention provides an additive combination comprising selected polyethylene glycols and certain polymeric viscosifiers such as CMHEC polymers which is manifested in better water loss control in a variety of drilling mud formulations. Formulations, e.g., comprising polyethylene glycols such as DOW E8000 and cellulose ethers such as CMHEC 420H provided drilling muds exhibiting good water loss properties even in hard brines similar to those brines available in the Williston Basin.

Typical analyses of Williston Basin brines are summarized in Table A.

TABLE A

Analyses of Brines in the Williston Basin (Sathe Laboratories, Williston, N.D.)

| Origin of Brine Sample | Analysis, ppm | | |
|---|---|---|---|
| | Cl− | Ca$^{++}$ | Mg$^{++}$ |
| Montana | | | |
| Reserve | 191,350 | 17,890 | 1,970 |
| Sidney | 182,300 | 22,660 | 2,190 |
| Sidney | 195,870 | 24,060 | 2,490 |
| Sidney | 128,720 | 24,360 | 1,640 |
| Sidney | 200,740 | 30,080 | 1,820 |
| North Dakota | | | |
| Bowman | 115,150 | 2,010 | 330 |
| Stanley | 149,940 | 8,620 | 1,520 |

EXAMPLE VII

The invention package referred to herein as a 1:1 wt/wt blend of Dow E8000 polyethylene glycol and a polyacrylamide polymer such as Hercules Reten 420 was mixed into a base mud comprising 3.5 weight percent attapulgite clay in saturated salt water to give a composition equivalent to 2 lb/bbl E8000 and 2 lb/bbl Reten 420. Similarly a composition was prepared with an acrylamide copolymer such as Hercules SPX 5025 (a 30:70 acrylamide/2-acrylamido-2-methylpropanesulfonic acid copolymer) and Dow E8000 polyethylene glycol. Loadings at 2 lb/bbl with no added E8000 were also prepared and tested. Results are summarized in Table 7.

TABLE 7

Water Loss Control For Polyacrylamide/Polyethylene Glycol Systems in Saturated Salt Water Mud

| Run No. | Components | | | Water Loss |
|---|---|---|---|---|
| | E8000# | PAM# | pH | (mL/30 min) |
| 44 | 0 | 2[a] | 7.0 | 13.0 |
| 45 | 2 | 2[a] | 7.1 | 9.0 |
| 46 | 0 | 2[b] | 7.2 | 17.0 |
| 47 | 2 | 2[b] | 7.2 | 10.0 |
| 5 | 1.0 | 0.0 | 8.1 | 136.0 |
| 6 | Base Mud** | 0.0 | 7.6 | 115.0 |

E8000 represents Dow E8000 (ca. MW @ 8000) polyethylene glycol; PAM represents polyacrylamide polymers
[a]Reten 420 (acrylamide homopolymer) was used in runs 44 and 45.
[b]SPX 5025 (30:70 acrylamide/2-acrylamido-2-methyl propanesulfonic acid copolymer) was used in runs 46 and 47.
**Base mud was 3.5 weight percent attapulgite clay in saturated salt water. Overnight standing of samples before testing permitted the polyacrylamide component to become hydrated.

Referring to runs 45 and 47 in Table 7 it is clearly evident that the inventive compositions exhibited good water loss control. Runs 5 and 6 show that individually the base mud, and polyethylene glycol (PEG) plus the base mud exhibited very high and undesirable water loss control. Thus, it is unexpected and surprising that the 1:1 wt/wt PEG/PAM systems in runs 45 and 47 gave better water loss control than the PAM systems of runs 44 and 46.

The following example provides additional systems of polyethylene glycol and acrylamide-derived polymers which control water loss in drilling muds. This example provides additional support for operability of the instant process and compositions.

EXAMPLE VIII

The runs summarized in Table 8 were carried out in essentially the same manner as those in Table 7 except that the freshly prepared samples were used, i.e., the samples did not stand at ambient conditions overnight before testing.

TABLE 8

Polyethylene Glycol/Polyacrylamide Systems in Saturated Salt Water Muds for Water Loss Control

| Run No. | Components | | Water Loss (mL/30 min.) |
|---|---|---|---|
| | E8000# | PAM# | |
| 48[a] | 0 | 1 | 134 |
| 5 | 1 | 0 | 136 |
| 48[a] | 0 | 2 | 14.2 |
| 48[a] | 0 | 3 | 9.6 |
| 48[a] | 1 | 1 | 27.5 |
| 48[a] | 0.5 | 1.5 | 17.8 |
| 48[a] | 1 | 2 | 10.9 |
| 49[b] | 0 | 1 | 170 |
| 5 | 1 | 0 | 136 |
| 49[b] | 0 | 2 | 188 |
| 49[b] | 0 | 3 | 42 |
| 49[b] | 1 | 1 | 28 |
| 49[b] | 0.5 | 1.5 | 10.2 |
| 49[b] | 1 | 2 | 8 |
| 50[c] | 0 | 1 | 148 |
| 5 | 1 | 0 | 136 |
| 50[c] | 0 | 2 | 30 |
| 50[c] | 0 | 3 | 33 |
| 50[c] | 1 | 1 | 23.8 |
| 50[c] | 0.5 | 1.5 | 20.5 |
| 50[c] | 1 | 2 | 12 |
| 51[d] | 0 | 1 | 240 |
| 5 | 1 | 0 | 136 |
| 51[d] | 0 | 2 | 208 |
| 51[d] | 0 | 3 | 132 |
| 51[d] | 1 | 1 | 87 |
| 51[d] | 0.5 | 1.5 | 36 |
| 51[d] | 1 | 2 | 9.5 |
| 52[e] | 0 | 1 | 58 |
| 5 | 1 | 0 | 136 |
| 52[e] | 0 | 2 | 13.9 |
| 52[e] | 0 | 3 | 5.8 |
| 52[e] | 1 | 1 | 48 |
| 52[e] | 0.5 | 1.5 | 27.5 |
| 52[e] | 1 | 2 | 14 |

[a]Reten 424 (40% hydrolyzed polyacrylamide) was used.
[b]Reten 420 (homopolymer of acrylamide) was used.
[c]A 30:70 acrylamide/2-acrylamido-2-methylpropane sulfonate copolymer was used.
[d]Betz 1160 (a cationic polyacrylamide) was used.
[e]A sodium polyacrylate was used.

Referring to run number 48 in Table 8, it is evident, particularly at a total additive loading of a 3 lb/bbl, that one lb of polyacrylamide can be "backed-out" with one pound of polyethylene glycol (PEG) to give essentially the same water loss control (9.6 mL/30 min vs. 10.9 mL/30 min). This is unexpected since PEG alone appears to be an ineffective water loss control agent (see Run No. 5 @ 136 mL/30 min).

Referring to run number 49 in Table 8, it is evident, particularly at a total additive loading of 2 lb/bbl, that 0.5 pound of polyacrylamide can be "backed-out" with 0.5 pound of PEG to give a greatly improved water loss control (10.2 mL/30 min vs. 188 mL/30 min). This is surprising since PEG alone appears to be an ineffective water loss control agent (see Run No. 5 @ 136 mL/30 min).

Referring to run number 50 in Table 8, similar conclusion can be drawn by considering the runs in which there is a partial replacement of the acrylamide copolymer with polyethylene glycol (PEG). At a total additive loading of 2 lb/bbl, if 0.5 pound of the copolymer is "backed-out" with 0.5 pound of PEG, the water loss control is improved from 30 mL/30 min to 20.5 mL/30. Again, this result is unexpected in view of run 5.

Referring to run number 51 in Table 8, it is evident, particularly at a total additive loading of 3 lb/bbl that one pound of the cationic polyacrylamide can be "backed-out" with one pound of PEG to give improved water loss control (9.5 mL/30 min vs. 132 mL/30 min). This is surprising in view of the poor water loss control exhibited by PEG alone (see Run No. 5 @ 136 mL/30 min).

Referring to run number 52 in Table 8, it is evident particularly at a polyacrylate loading of 2 lb/bbl that the addition of PEG to the system did not worsen the water loss control, i.e., 14 mL/30 min is essentially the same as 13.9 mL/30 min. This is unexpected because PEG alone is an ineffective water loss control agent (see Run No. 5 @ 136 mL/30 min). A similar conclusion can be reached by considering the addition of one pound of polyethylene glycol to the system containing one pound/bbl sodium polyacrylate (see 58 mL/30 min vs. 48 mL/30 min).

In the following example, the base mud was prepared in synthetic Baroid hard brine by adding 16 lb/bbl P95 clay, 2 lb/bbl Flosal fiber and 1 lb/bbl of a 50:50 mixture of CMHEC 420H and polyethylene glycol (Dow E8000). The synthetic Baroid hard brine was prepared by adding 1235 g NaCl, 308 g $CaCl_2$ and 78.5 g MgCl$_2$.6H$_2$O to 5000 mL tap water. The calcium content was about 19,000 ppm.

EXAMPLE IX

This example demonstrates the improvement in carrying capacity of the above base mud effected by the addition of guar gum or KELZAN to said mud. Some represenstative results are summarized in Table 9.

TABLE 9

| Run No. | Type of Run | Additives (lb/bbl) | Initial Properties PV/YP | Gels | WL | Properties After Thermal Aging* PV/YP | Gels | Wl |
|---|---|---|---|---|---|---|---|---|
| 53 | CONTROL | None (Base Mud) | 12/12 | 2/4 | 10.4 | NR# | NR# | NR# |
| 54 | INVENTION | KELZAN XC (0.19) | 12/15 | 3/6 | 10.7 | 13/19 | 6/9 | 10.2 |
| 55 | INVENTION | Guar Gum (0.8) | 15/27 | 5/8 | 8.0 | 17/24 | 4/7 | 6.9 |

*Aged 16 hours at 80° C.
PV represents plastic viscosity (centipoise); YP represents yield point (lb/100 ft$^2$); Gels represent gel strength (10 sec/10 min, lb/100 ft$^2$); WL represents API water loss, mL/30 min.
NR represents "Not Recorded."

Referring to the results in Table 9, it is evident that the inventive system CMHEC 420H/E8000/Gum (run 55) exhibited higher yield point values initially (27) and after thermal aging (24) than the system CMHEC 420H/E8000/Kelzan (run 54) which exhibited, respectively, yield point values of 15 and 19. Both inventive systems (runs 54 and 55) gave higher yield points initially (27, 15) than did the CMHEC 420H/E8000 control system (12) in run 53. Water loss control was also better in inventive run 55 than in invention run 54 and control run 53. Considering the overall balance of properties, i.e., PV/YP, Gels and WL, the inventive system of CMHEC 420H/E8000/guar gum was better than the other runs in Table 9.

EXAMPLE X

This example demonstrates the advantage of adding mixtures of guar gum and polyethylene glycol to a base mud containing 0.5 lb/bbl CMHEC 420H and 0.5 lb/bbl PEG over the addition of guar gum alone. The effect is more obvious in the properties of the mud after thermal aging (16 hours) at 250 F. Representative results are summarized in Table 10.

TABLE 10

| Run No. | Type of Run | Additives | Initial Properties$^a$ PV/YP | Gels | WL | Properties After Thermal Aging* PV/YP | Gels | WL |
|---|---|---|---|---|---|---|---|---|
| 56 | Control$^b$ | None Base Mud | 6/4 | 1.5/3 | 13.5 | 5/4 | 2/3 | 28.2 |
| 57 | Control$^c$ | Guar Gum | 28/63 | 18.5/22 | 6.3 | 13/10 | 3/4.5 | 8.2 |
| 58 | Invention$^d$ | Guar Gum E8000 | 21.5/55.5 | 14/14.5 | 5.8 | 16.5/17.5 | 5/6.5 | 8.2 |

*Aged 16 hours @ 250 F.
$^a$PV, YP, Gels and WL are defined in footnote a of Table 9.
$^b$Base mud contained 16 lb/bbl P95 clay, 2 lb/bbl FLOSAL fiber (asbestos), 0.5 lb/bbl PEG, and 0.5 lb/bbl carboxymethylhydroxyethyl cellulose (CMHEC 420H).
$^c$Test mud contained 16 lb/bbl P95 clay, 2 lb/bbl FLOSAL fiber (asbestos), 0.5 lb/bbl PEG, and 0.5 lb/bbl CMHEC 420H and 2 lb/bbl guar gum.
$^d$Test mud contained 16 lb/bbl P95 clay, 2 lb/bbl FLOSAL fiber (asbestos), 0.5 lb/bbl CMHEC 420H, 1.5 lb/bbl guar gum and 1.0 lb/bbl polyethylene glycol (E8000).

Referring to the runs in Table 10, it is evident that the overall balance of properties, i.e., PV/YP, Gels and WL, is better in the inventive CMHEC 420H/guar gum/PEG system (run 58) than in the systems of runs 56 and 57. Attention is called to the properties of the inventive system in run 58 after thermal aging: The yield point and gel strength values were sustained after the heat treatment to a larger extent than was observed in the other systems of runs 56 and 57.

I claim:

1. A water-based drilling mud composition comprising in combination (a) sufficient aqueous solution of mineral salts having greater than 10,000 ppm dissolved solids content to maintain the mud as a fluid,
    (b) sufficient clayey material to form a filter cake on the wall of a well,
    (c) at least one water dispersible polymeric viscosifier selected from the group consisting of carboxyalkyl hydroxyalkyl cellulose ethers, carboxyalkyl cellulose ethers, hydroxyalkyl cellulose ethers, polyacrylamides, cellulose sulfate esters, guar gum, and heteropolysaccharides produced by fermentation of carbohydrates by bacteria of the genus Xanthomonas, and
    (d) a polyethylene glycol component having a molecular weight ranging from about 6,000 to about 20,000 wherein the weight ratio of (c) to (d) ranges from about 3:1 to about 1:3, and the combined amount of (c) and (d) being sufficient to reduce water loss due to filtration through said filter cake.

2. The drilling mud of claim 1 wherein said amount is in the range of about 0.25 to about 3 lbs/bbl of said mud.

3. A drilling mud according to claim 1 wherein (c) is a cellulose ether selected from the group consisting of carboxymethylhydroxyethyl cellulose (CMHEC), carboxymethyl cellulose (CMC), and hydroxyethyl cellulose (HEC).

4. A drilling mud according to claim 1 wherein (c) is guar gum.

5. A drilling mud according to claim 1 wherein (c) is cellulose sulfate.

6. A drilling mud according to claim 1 wherein (c) is (1) a mixture of a polyacrylamide and guar gum or (2) a mixture of polyacrylamide and a heteropolysaccharide.

7. A drilling mud according to claim 1 wherein (c) is a heteropolysaccharide produced by fermentation of carbohydrates by bacteria of the genus Xanthomonas.

8. A drilling mud according to claim 1 wherein the total amount of (c) and (d) present ranges from about 0.75 to about 2.0 lb/bbl of mud and wherein the weight ratio of (c) to (d) is about 1:1.

9. A composition according to claim 1 which is a brine containing from about 0.75 to about 2.0 lbs of a mixture of (c) and (d) per barrel of mud.

10. A composition according to claim 9 wherein there are approximately equal weights of (c) and (d).

11. In a method of drilling a well with drilling tools, the steps of circulating through the well during said drilling, a water-based drilling mud according to claim 1 which forms a filter cake on the wall of said well.

12. The method of claim 11 wherein the amount of (c) plus (d) in said mud is in the range of about 0.25 to about 3 lb/bbl of said mud.

13. The method of claim 11 wherein the amount of (c) plus (d) in said mud is in the range of about 0.75 to about 2.0 lbs/bbl of mud.

14. The method according to claim 12 wherein there are about equal weights of (c) and (d) present in said mud.

15. A method for preparing an aqueous drilling fluid composition containing clay, mineral salts dissolved in said fluid composition to provide greater than 10,000 ppm dissolved solids content and, optionally, weighting, suspending and conditioning agents exhibiting improved rheological properties which comprises incorporating therein
(a) a first-water dispersible polymeric viscosifier selected from the group consisting of carboxyalkyl hydroxyalkyl cellulose ethers, carboxyalkyl cellulose ethers, hydroxyalkyl cellulose ethers, polyacrylamides, cellulose sulfate esters, guar gum, and heteropolysaccharides produced by fermentation of carbohydrates by bacteria of the genus Xanthomonas, and
(b) a polyethylene glycol having a molecular weight ranging from about 6,000 to about 20,000 in a weight ratio of (a) to (b) ranging from about 3:1 to about 1:3, the combined amount of (a) and (b) being sufficient to reduce water loss of said drilling fluid composition and
(c) adding a yield point improving amount of a second polymer selected from said polymeric viscosifiers which is different from the first polymeric viscosifier incorporated into said drilling fluid composition.

16. A method according to claim 15 wherein the amount of the second polymeric viscosifier is sufficient to provide a total weight ratio of polymeric viscosifiers to polyethylene glycol ranging from about 3:1 to about 1:3.

17. A method according to claim 16 wherein said first polymeric viscosifier is carboxymethyl hydroxyethyl cellulose, carboxymethyl cellulose or hydroxyethyl cellulose and said second polymeric viscosifier is guar gum.

18. A method according to claim 17 wherein said first polymeric viscosifier is carboxymethyl hydroxyethyl cellulose.

19. A method according to claim 16 wherein said first polymeric viscosifier is carboxymethyl hydroxyethyl cellulose, carboxymethyl cellulose or hydroxyethyl cellulose and said second polymeric viscosifier is a heteropolysaccharide.

20. A method according to claim 19 wherein said first polymeric viscosifier is carboxymethyl hydroxyethyl cellulose.

21. A method according to claim 17 wherein said (a) and (b) is about a 50:50 mixture of carboxymethyl hydroxyethyl cellulose and polyethylene glycol having a molecular weight of about 8,000.

22. A method according to claim 18 wherein said (a) and (b) is about a 50:50 mixture of carboxymethyl hydroxyethyl cellulose and polyethylene glycol having a molecular weight of about 8,000.

* * * * *